United States Patent
Georgescu et al.

[15] 3,673,109
[45] June 27, 1972

[54] PROCESS FOR THE REACTIVATION OF PLATINUM-ON-ALUMINA CATALYSTS

[72] Inventors: Eugenia Georgescu; Ion Ion Ghejan; Victor Bugur; Ion Zirna; Theodora Mazare; Elena-Lygia Popescu; Bujor Olteanu; Nicolae Marculescu; Traian-Mircea Filotti; Marius-Aurel Barbul; Ion Calin, all of Ploiesti, Romania

[73] Assignee: Institutul De Cercetari Pentru Prelucrarea Titeiului, Ploiesti-Boulv., Republicii, Romania, Ploiesti, Romania

[22] Filed: April 1, 1970

[21] Appl. No.: 24,845

[30] Foreign Application Priority Data

April 8, 1969 Romania...................................59667

[52] U.S. Cl...............................252/415, 208/140, 252/419
[51] Int. Cl........................................B01j 11/18, B01j 11/02
[58] Field of Search .......................252/415, 419, 416, 441; 208/140, 139

[56] References Cited

UNITED STATES PATENTS

| | | |
|---|---|---|
| 2,785,139 | 3/1957 | Heinemann............................252/415 |
| 3,041,272 | 6/1962 | Burk, Jr. et al. ........................208/139 |
| 3,117,076 | 1/1964 | Brennan et al........................208/140 |
| 2,897,137 | 7/1959 | Schwarzenbek......................208/140 |
| 3,011,967 | 12/1961 | Schmitkons et al...................208/139 |
| 3,400,073 | 9/1968 | Schwarzenbek et al. .............208/140 |
| 2,785,138 | 3/1957 | Milliken, Jr............................252/415 |

FOREIGN PATENTS OR APPLICATIONS 789,791 1/1958 Great Britain........................208/140

*Primary Examiner*—Daniel E. Wyman
*Assistant Examiner*—P. E. Konopka
*Attorney*—Karl F. Ross

[57] ABSTRACT

A process for reactivating or regenerating a catalyst of the platinum-on-alumina type, comprising the steps of:

a. maintaining the catalyst in a reducing medium, preferably containing hydrogen gas, at a temperature between 400° C and 600° C, for a period of substantially 2 to 8 hours in a velocity of gas flow of $1 \times 10^{-2}$ to $1 \times 10^{-1}$ m$^3$ of gas per hour and per kg of catalyst;

b. halogenating the catalyst thereafter in a reducing gas medium at a temperature between 400° C and 550° C with a gas-flow rate of $1 \times 10^{-2}$ to $4 \times 10^{-1}$ m$^3$ of gas per hour per kg of catalyst using a halogenated organic compound with one to six carbon atoms per molecule and an atomic ratio of halogen:hydrogen no greater than unity and a partial pressure of this compound between 1 and 100 mm Hg for a period of one-half to 10 hours and in the presence of a moisture content of 10 to 50 ppm to bring the halogen content of the catalyst to 0.1 to 1 percent by weight; and c. oxidizing the catalyst treated in step (b) with oxygen-containing gas of an oxygen concentration increased from 0.2 to atmosphere concentrations over a period of 5 to 15 hours at a temperature of 400° to 600° C and with a gas-flow velocity of 0.5 to 5 m$^3$ per hour per kg of catalyst.

3 Claims, No Drawings

3,673,109

PROCESS FOR THE REACTIVATION OF PLATINUM-ON-ALUMINA CATALYSTS

1. Field of the Invention

The present invention relates to a process for reactivating used platinum-on-alumina catalysts, in order to restore their activity and prolong their life.

2. Background of the Invention

The coke deposits on the catalysts containing a metal of Group VIII of the Periodical System deposited on a refractory support, such as alumina, are usually removed by applying oxidizing treatments. Sometimes, the oxidizing treatment becomes insufficient for restoring the activity of the catalsts, and a special reactivation treatment is used.

Thus, a series of processes for the reactivation of catalysts by the aid of halogenating treatments is known.

The treatments with various halogenated compounds are used to a great extent, and applied periodically, for regenerating of the catalysts by adding the halogenated compounds to the feed stock, and also after regeneration; the compound thus may also be added to the feedstock continuously during the normal utilization of the catalyst. The periodical treatment of the catalyst is hence made with halogenated organic compounds by injecting them into the feedstock until the desired level of halogen is attained, and in order to maintain this level in the catalyst, halogenated compounds are injected also during the normal operation cycle. Some literature references recommend only this latter technique.

These processes have the disadvantage of maintaining the acidity characteristics of the catalyst only, without having the possibility of a redistribution of the platinum. Along the same line are also the methods that recommend the treatment with hydrochloric acid in a reducing medium, respectively in hydrogen. Since these treatments do not imply an oxidizing treatment step, there is not achieved a redistribution of the platinum on the catalyst surface and in consequence, the activity increase is limited.

Another important drawback of these methods is the fact that the added halogen is not entirely fixed on the catalyst, the excess being carried along in the recirculating gases. In this manner, the corrosion both of the equipment of the plants and of equipment coupled with the latter occurs. In such a situation are hydrofining plants which receive hydrogen rich gases from the reforming plants. In this case, measures have to be taken to prevent these drawbacks.

It has also been proposed to reactuate the catalyst by treatments with gaseous chlorine or compounds thereof, in an oxidizing medium; some of these methods recommend moreover the concomitant use of water vapors. Some of these methods involve significant difficulties in carrying out of the process, since work is done with gaseous chlorine; furthermore, the chlorination unassociated with the alternation of reducing and oxidizing media leads to limited results regarding the general effect of the reactivation processes.

Methods are also known, that recommend the regeneration-reactivation of catalysts by alternate reducing and oxidizing treatments, without halogen addition. By these treatments, only a slight improvement in the activity of the catalysts is obtained, since a low conversion of platinum metal into oxidized platinum occurs. As halogen is not added, the restoring of the catalyst acidity is not obtained.

SUMMARY OF THE INVENTION

The process according to the invention eliminates the above-mentioned disadvantages, in that, in order to restore the activity and to prolong the life of the partially or entirely deactivated catalysts by re-establishing the halogen content, by redistributing platinum and by reducing the amount of metallic impurities, a sequence of treatments in the gaseous phase is applied to said catalysts, either before or after regeneration, in situ or outside the plant, said treatments consisting in maintaining the catalyst in a reducing medium, preferably hydrogen, at atmospheric pressure, for 2 to 8 hours, at temperatures between 400° and 600° C, with a velocity of gas flow in the range of $1 \times 10^{-2}$ to $1 \times 10^{-1}$ $m^3$ of gas/hour.kg of catalyst (STP - Standard Temperature and Pressure) and a moisture content of the gas of from 10 to 50 ppm, (parts per million) the catalyst being subsequently halogenated in a reducing medium, preferably in hydrogen, at atmospheric pressure at temperatures between 400° and 550° C, with a rate of gas flow of $1 \times 10^{-2}$ to $4 \times 10^{-1}$ $m^3$ of gas/hour.kg of catalyst, (STP) by passing over the catalyst a halogenated organic compound, preferably an alkane chloride containing one to six carbon atoms per molecule and having an atomic ratio of halogen: hydrogen $\leq 1$, with a partial vapor pressure of the halogenated organic compound between 1 and 100 mm Hg, for one-half to 10 hours and at a moisture content of from 10 to 50 ppm, in such a manner sufficient to raise the halogen content of the catalyst to 0.1 to 1 percent by weight, preferably between 0.4 and 0.7 percent by weight; after purging with an inert gas, the catalyst is submitted to an oxidizing treatment in the gaseous phase, employing oxygen diluted with an inert gas, such that the concentration of oxygen varies in time from 0.2 up to the concentration corresponding to the composition of air at the atmospheric pressure, at temperatures comprised between 400° and 600° C, during 5 to 15 hours, with a velocity of gas flow of from 0.5 to 5 $m^3$/hour.kg of catalyst, (STP) after which the catalyst is ready to be used again in the process.

SPECIFIC EXAMPLES

The application of the process according to the invention is illustrated in the following four example.

EXAMPLE 1

A platinum on active alumina catalyst A, partially deactivated by experimenting under industrial conditions by passing over it approximately 20 $m^3$ of feed stock/kg of catalyst, was submitted to the reactivation process.

The used and regenerated catalyst was treated with hydrogen in the followinG way: The temperature was raised at 150° C per hour up to 480° C and maintained for 8 hours at this temperature, with a velocity of hydrogen flow of $9 \times 10^{-2}$ $m^3$/ hour.kg of catalyst (STP), and a partial pressure of dichloroethane was maintained at 50 mm Hg for 70 minutes, after which the dichloroethane feed was interrupted, and the catalyst was maintained under the same conditions of temperature and hydrogen rate of flow for 60 minutes more. Subsequent to cooling in a hydrogen stream and purging with nitrogen, the chlorinated catalyst was oxidized with air, with a velocity of air flow of 1.8 $m^3$/hour.kg of catalyst, (STP) for 8 hours at 450° C, the temperature being raised at 150° C/hour. Then, the catalyst was cooled in an air stream.

After the reactivation treatment, the catalyst was tested to determine its activity.

The experiments of reforming for the determination of the activity of the fresh, deactivated and reactivated catalyst A were carried out under the following conditions : pressure 40 atm, volumetric rate of flow 2 vol/vol.hour, recycle ratio $H_2$:feedstock 12:1, and at two temperature levels: 490° and 500° C. As feed stock a hydrofined gasoline cut was used with distillation range 130° to 190° C, RON 45, containing 15 percent by vol. aromatics and 34 percent by vol. naphthenes.

The criterion for the appreciation of the catalyst activity was the RON and the aromatics content of the depentanized reformed benzine, as well as the yield in liquid product.

Thus, under the abovementioned conditions, for the fresh, used and reactivated catalyst, the activity characteristics shown in Table 1 were obtained.

TABLE 1

[Characteristics of the activity of catalyst A: fresh, used and reactivated]

| Catalyst | RON (without ethylation) | | Aromatics plus olefins, percent by vol. | | Yield in depentanized products, percent by weight | |
|---|---|---|---|---|---|---|
| | 490° C. | 500° C. | 490° C. | 500° C. | 490° C. | 500° C |
| Fresh | 90 | 96.8 | 61.2 | 69.3 | 85.0 | 80.9 |
| Used | 75 | 80 | 44.5 | 46.5 | 90.5 | 89.2 |
| Reactivated | 94 | 98 | 66.7 | 73.0 | 81.4 | 76.2 |

Furthermore, for the appreciation of the degree of redispersion of platinum on the catalyst, the proportion of soluble platinum of the fresh, used and reactivated catalyst was determined, as well as the activity of dehydrocyclization of the catalyst. The determinations of soluble platinum were carried out by the method of its solubilization in acetylacetone; the dehydrocyclization activity was determined in the microreactor plant with gas chromatograph by dehydrocyclization of n-heptane at the pressure of 16 atm and the temperature of 425° C. The obtained data for the fresh, used and reactivated catalyst are shown in Table 2.

TABLE 2

[Chemical and activity characteristics]

| Catalyst A | Chlorine content, percent by wt. | Platinum content, percent by wt. | Soluble Pt cont., percent | nC$_7$ dehydrocyclization activity | | | |
|---|---|---|---|---|---|---|---|
| | | | | De A.R.×10$^6$ moles nC$_7$/sec., g. | Selectivity toluene, percent | Selectivity i-C$_7$, percent | Selectivity C$_1$–C$_4$* percent |
| Fresh | 0.78 | 0.37 | 49.6 | 5.3 | 12.8 | 66.8 | 13.4 |
| Used and regenerated | 0.18 | 0.37 | 0 | 1.5 | 0 | 64.5 | 15.5 |
| Reactivated | 0.62 | 0.37 | 20.9 | 4.0 | 22.3 | 58.3 | 11.4 |

* The difference up to 100% represents C$_5$–C$_6$ hydrocarbons.

Another improvement over the used catalyst was the reduction of impurities content. The impurities content with the fresh, used, and reactivated catalyst is shown in Table 3.

TABLE 3

[The content of impurities in catalyst A]

| Catalyst | Content of impurities, percent by wt. | | | | |
|---|---|---|---|---|---|
| | Na$_2$O | Fe | Pb | Cu | Mg |
| Fresh | 0.012 | 1.5·10$^{-2}$ | Absent | 10$^{-3}$ | 1·10$^{-3}$ |
| Used | 0.0135 | 1.8·10$^{-1}$ | 6.7·10$^{-3}$ | 7.4·10$^{-2}$ | 4.4·10$^{-3}$ |
| Reactivated | 0.0105 | 0.68·10$^{-1}$ | 0.35·10$^{-3}$ | 0.26·10$^{-2}$ | 2.2·10$^{-3}$ |

EXAMPLE 2

The catalyst A, partially deactivated after industrial processing of about 10 m³ of feedstock/kg of catalyst and regenerated, was reactivated under the same conditions as in Example 1, varying only the partial pressure of dichloroethane vapors, which was maintained at 60 mm Hg, and the duration of chlorination. Chlorination lasted for 90 minutes, after which the oxidizing treatment was applied for 8 hours at 450° C.

The chlorine content, the proportion of soluble platinum, and the activity of dehydrocyclization of n-heptane were determined for the partially used and for the reactivated catalyst. The obtained data are shown in Table 4.

The content of impurities of catalyst A, partially deactivated and reactivated, was also determined. In Table 5, the diminishing of the content of impurities as a consequence of the reactivation process is stated.

TABLE 5

[Content of impurities of catalyst A]

| Catalyst A | Impurities, percent by wt. | | | | |
|---|---|---|---|---|---|
| | Na$_2$O | Fe | Pb | Cu | Mg |
| Used and regenerated | 0.0166 | 1.3·10$^{-1}$ | 6.4·10$^{-3}$ | 4.10$^{-3}$ | 4.2·10$^{-3}$ |
| Reactivated | 0.0148 | 0.22·10$^{-1}$ | 5×10$^{-3}$ | 2.10$^{-3}$ | 3.10$^{-3}$ |

EXAMPLE 3

Catalyst B, deactivated by industrial operation after the processing of approx. 40 m³ feedstock/kg of catalyst and regenerated, was subjected to reactivation. The reactivation was effected under the conditions of Example 1, maintaining the partial pressure of dichloroethane vapors at 33 mm Hg for 120 minutes. To appreciate its activity, the used and the reactivated catalyst were tested under the conditions mentioned in Example 1. (Table 6)

TABLE 6

[The activity of the used and regenerated catalyst B after reactivation]

| Catalyst B | RON (without ethylation) | | Aromatics plus olefins, percent by vol. | | Yield in depentanized product, percent by weight | |
|---|---|---|---|---|---|---|
| | 490° C. | 500° C. | 490° C. | 500° C. | 490° C. | 500° C. |
| Used and regenerated | 83.7 | 88.7 | 52 | 58.5 | 84 | 80 |
| Reactivated | 91 | 93 | 61 | 64 | 81 | 76.6 |

In this example, as feedstock a hydrofined gasoline cut was used, having distillation range 130° to 190° C, RON 46, and containing 14.0 percent by vol. aromatics and 22.0 percent by vol. naphthenes.

The chlorine content, the soluble platinum content and the dehydrocyclization activity were also determined; the respective data are shown in Table 7.

TABLE 4

[Chemical and activity characteristics of catalyst A]

| Catalyst A | Chlorine content, percent by wt. | Proportion of sol. pt., percent | n-C$_7$ dehydrocyclization activity | | | |
|---|---|---|---|---|---|---|
| | | | De A.R. ×10$^6$ moles nC$_7$ sec., g. | Selectivity toluene, percent | Selectivity i-C$_7$, percent | Selectivity C$_1$–C$_4$, percent |
| Used and regenerated | 0.26 | Absent | 1.3 | 17.5 | 64.8 | 12.1 |
| Reactivated | 0.67 | 43 | 6.84 | 28.6 | 43.0 | 16.6 |

The diminishing of the content of impurities after reactivation is shown in Table 8.

TABLE 7

[Chemical and activity characteristics of catalyst B]

| Catalyst B | Chlorine content, percent by wt. | Pt. cont., percent by wt. | Proportion of soluble Pt., percent by wt. | Dehydrocyclization activity | | | |
|---|---|---|---|---|---|---|---|
| | | | | Dc A.R.×10⁴ moles n-$C_7$/ sec., g. | Selectivity toluene, percent | Selectivity i-$C_7$, percent | Selectivity $C_1$-$C_4$, percent |
| | 1 | 2 | 3 | 4 | 5 | 6 | 7 |
| Used and regenerated | 0.086 | 0.339 | 0 | 3.9 | 9.5 | 78.8 | 6.9 |
| Reactivated | 0.47 | 0.339 | 23.6 | 4.3 | 19.0 | 49.6 | 17.5 |

EXAMPLE 4

The deactivated and not regenerated catalyst B (presented in Example 3), coked by industrial processing of approximately 40 m³ of feedstock/kg of catalyst, was submitted to reactivation by applying the conditions of Ex. 1, by maintaining it in a reducing medium ( which was hydrogen from reforming), the chlorination being effected at a partial pressure of dichloroethane vapors of 30 mm Hg during 4 hours. The last operation, the oxidizing treatment, was effected in two steps, as a consequence of the necessity of burning the coke deposited on the catalyst concomitantly with the oxidation of the reactivated catalyst. The oxidizing treatment was carried

TABLE 8

[Content of impurities of the used and reactivated catalyst B]

| Catalyst B | Impurities, percent by weight | | | | |
|---|---|---|---|---|---|
| | $Na_2O$ | Fe | Pb | Cu | Mg |
| Used and regenerated | 0.017 | 0.14 | 4.0·10⁻³ | 7.5·10⁻³ | 3.10⁻³ |
| Reactivated | 0.015 | 0.09 | 1.5·10⁻³ | 1.10⁻³ | 3.10⁻³ | out during 15 hours; during the first 8 hours an oxygen diluted with nitrogen was used, such that the oxygen content of the gas was 0.2 percent, and in the last 7 hours the operation was continued by using air. The temperature was maintained at 450° C during the whole oxidation process; the rest of the conditions was the same as in Example 1.

In order to confirm the efficiency of the treatment when applied on the not regenerated catalyst too, the RON and the content of aromatics of the reformed product at two temperature levels, under the experimental conditions shown in Example 1, were determined. The obtained data are presented in Table 9.

TABLE 9

The activity of the reactivated catalyst B

| Characteristics | Temperature, °C | |
|---|---|---|
| | 490 | 500 |
| RON (without ethylation) | 87 | 92 |
| Aromatics + olefins,% by vol. | 56.5 | 64 |
| Yield in depentanized product, % by w. | 85 | 77 |

The process according to the invention offers the following advantages:
 the restoration of the halogen content of the catalyst;
 the redistribution of the platinum on the catalyst;
 the removal of the metallic impurities from the surface of the catalyst;
 the increase in activity of the catalysts by raising the ON of the reformed gasoline with from 3 to 20 RON units and the aromatics content with from 5 to 30 percent by vol., depending on the type of the catalyst submitted to the reactivation process and on its state, on the structural composition of the feedstock and the time of use of the catalyst;
 the prolongation of the useful life of the catalyst, so that after one or 2 years of use, the catalyst may be brought again to a level of activity equal or even superior to that of the fresh catalyst.

The carrying out of the operations according to the invention does not require supplemental investment and does not involve technical difficulties in the execution;
 the halogenating treatment involving finally an oxidizing treatment, the excess of halogen is removed before the beginning of the normal experimental cycle and thus corrosion of the plant equipment is avoided;
 the preventing of plant corrosion, as a consequence also of the fact that periodic halogenation of the catalyst by introducing the halogen into the feed stock is no longer necessary in the course of the normal operation cycle;
 for the operations carried out in a reducing medium, hydrogen rich gases resulting from the reforming plant may be employed;

When this reactivation process is applied to the coked and not regenerated catalyst, a saving of time is achieved, since the application of the described sequence of operations is possible immediately after terminating the feed of the industrial plants using these catalysts in view of the general revision. From the analysis of the results of activity obtained with catalyst B before and after regeneration (Examples 3 and 4) , it is found that comparable results are obtained by applying the reactivation process in both variants.

What is claimed is:

1. A process for reactivating a coked platinum-on-alumina hydrocarbon reforming catalyst to re-establish the halogen content, redistribute the platinum, and reduce the content of metallic impurities, essentially comprising the steps of:
    a. maintaining the platinum-on-alumina catalyst at substantially atmospheric pressure in a gaseous reducing medium consisting essentially of hydrogen with a gaseous flow velocity of substantially $1 \times 10^{-2}$ to $1 \times 10^{-1}$ m³ per hour per kg of catalyst (STP) at a temperature of substantially 400° to 600° C over a period of substantially 2 to 8 hours and with a moisture content of the gas between substantially 10 and 50 ppm;
    b. chlorinating the catalyst treated in step (a) with a chloroalkane containing one to six carbon atoms and having a halogen:hydrogen atomic ratio of at most unity, in a gaseous reducing medium consisting essentially of hydrogen, at substantially atmospheric pressure at a temperature between substantially 400° and 550° C, at a partial pressure of said chloroalkane of substantially 1 to 100 mg. Hg., and with a gas-flow rate of substantially $1 \times 10^{-2}$ to $4 \times 10^{-1}$ m³ of gas per hour per kg of the catalyst (STP), and in the presence of a moisture content of substantially 10–50 ppm for a period of one-half to 10 hours and sufficient to raise the halogen content of the catalyst to substantially 0.1 to 1 percent by weight; and
    c. treating the catalyst of step (b) with oxygen diluted with an inert gas, the concentration of said oxygen varying in time and increased from an oxygen concentration of 0.2 up to atmospheric-oxygen concentration with a gas-flow velocity of substantially 0.5 to 5 m³ per hour of gas per kg of catalyst (STP) at a temperature between substantially 400° and 600° C over a period of substantially 5 to 15 hours.

2. The process defined in claim 1 wherein the gaseous medium used in at least one of steps (a) and (b) is a hydrogen-rich gas derived from a gasoline-reformation plant.

3. The process defined in claim 2 wherein said chloroalkane is dichloromethane.

* * * * *